(12) United States Patent
Wang

(10) Patent No.: US 12,144,324 B1
(45) Date of Patent: Nov. 19, 2024

(54) EGG INCUBATOR BASE AND EGG INCUBATOR

(71) Applicant: Wuxi Ai Ruide Plastic Products Co., Ltd., Wuxi (CN)

(72) Inventor: Wei Wang, Wuxi (CN)

(73) Assignee: Wuxi Ai Ruide Plastic Products Co., Ltd., Wuxi (CN)

( * ) Notice: Subject to any disclaimer, the term of this patent is extended or adjusted under 35 U.S.C. 154(b) by 0 days.

(21) Appl. No.: 18/629,998

(22) Filed: Apr. 9, 2024

(51) Int. Cl.
*A01K 41/06* (2006.01)
*A01K 41/02* (2006.01)
*A01K 41/04* (2006.01)

(52) U.S. Cl.
CPC .............. *A01K 41/06* (2013.01); *A01K 41/02* (2013.01); *A01K 41/04* (2013.01)

(58) Field of Classification Search
CPC ...... A01K 41/06; A01K 41/02; A01K 41/023; A01K 41/04
See application file for complete search history.

(56) References Cited

U.S. PATENT DOCUMENTS

| | | | | |
|---|---|---|---|---|
| 3,584,605 A * | 6/1971 | Schwartz | ............ | A01K 41/023 219/442 |
| 3,783,832 A * | 1/1974 | Marsh | .................... | A01K 41/06 219/400 |
| 5,690,055 A * | 11/1997 | Wenstrand | ............ | A01K 41/02 119/309 |
| 11,819,009 B1 * | 11/2023 | Wang | ..................... | A01K 41/06 |
| 2016/0135434 A1 * | 5/2016 | Bodenhamer | ........ | A01K 41/023 119/318 |
| 2017/0181413 A1 * | 6/2017 | Bodenhamer | .......... | A01K 41/04 |
| 2019/0208749 A1 * | 7/2019 | Clark, Jr. | ............... | A01K 41/06 |
| 2019/0335718 A1 * | 11/2019 | Zhao | ..................... | A01K 41/06 |
| 2024/0138378 A1 * | 5/2024 | Meng | ..................... | A01K 41/04 |
| 2024/0196870 A1 * | 6/2024 | Wang | ..................... | A01K 41/06 |

FOREIGN PATENT DOCUMENTS

| | | | |
|---|---|---|---|
| CN | 205052499 U | * | 3/2016 |
| CN | 213756247 U | | 7/2021 |
| CN | 215957784 U | | 3/2022 |
| CN | 216088312 U | | 3/2022 |
| KR | 20070034684 A | * | 3/2007 |
| KR | 20130026093 A | * | 3/2013 |
| KR | 101880501 B1 | * | 7/2018 |

\* cited by examiner

*Primary Examiner* — Trinh T Nguyen
(74) *Attorney, Agent, or Firm* — Nitin Kaushik

(57) ABSTRACT

The present application relates to the technical field of incubators, and discloses an egg incubator base including: a driving mechanism, a water supply device, a base for holding eggs, and a rotary seat for driving the eggs to rotate. Cooperation between a first sub-cavity, a second cavity and the water supply device in an embodiment of the present application can provide the egg incubator with two different humidity environments to operate without opening the egg incubator, to achieve the requirements of different environmental humidity for different time periods of the egg incubator. Secondly, the present application also provides a driving mechanism in the second sub-cavity, so that the installation space in an accommodating cavity can be further optimized.

10 Claims, 7 Drawing Sheets

EGG INCUBATOR BASE AND EGG INCUBATOR

TECHNICAL FIELD

The present application relates to the technical field of incubators, and in particular to an egg incubator base and an egg incubator.

BACKGROUND

Many farmers raising poultry or game birds utilize egg incubators which typically provide a controlled climate and environment for the production of healthy poultry to realize artificial incubation.

Certain humidity needs to be maintained for the eggs, a certain humidity, which is as important as temperature, is also one of the key factors to determine the incubation performance. Generally, the incubation humidity should be maintained at about 50% during 1-18 days of incubation, and should be maintained at about 60% during 19-21 days of incubation.

In the prior art, an egg incubator is a device for incubating eggs, and it is necessary to provide a water storage tank inside the incubator for water storage to maintain the humidity inside the incubator, and to volatilize water to form water vapor by the temperature and air flow inside the incubator. However, due to the conventional structure of the egg incubator, a water injection structure is complicated and water needs to be frequently added.

SUMMARY

An objective of the present application is to provide an egg incubator base and an egg incubator capable of providing different humidity environments at different times.

In order to solve the above technical problem, the present application provides an egg incubator base, including: a driving mechanism, a water supply device, a base for holding eggs, and a rotary seat for driving the eggs to rotate; wherein the base has an accommodating space; a central position of the base is recessed in a first direction to form a recess; a first diaphragm is provided in the recess; the first diaphragm separates the recess to form a first cavity and a second cavity; a second diaphragm is provided in the first cavity to divide the first cavity into a first sub-cavity and a second sub-cavity provided at intervals along the first direction; the first sub-cavity and the second cavity are communicated with the accommodating space; the base has a first passage having one end communicated with the second cavity and the other end communicated with the water supply device; the driving mechanism is provided in the second sub-cavity and is used for driving the rotary seat to rotate in the accommodating space; and the water supply device is configured to be able to fill the second cavity with water through the first passage such that water passes over the first diaphragm into the first sub-cavity.

Optionally, the egg incubator base further includes a sleeve; wherein the sleeve is provided on the base and encloses with the base to form the recess; the first direction is an axis of the sleeve.

Optionally, the rotary seat includes: a stopper and a turntable; the turntable is sleeved on the sleeve; the stopper is connected to the driving mechanism; and the stopper is connected to the turntable.

Optionally, the turntable is provided with a plurality of receiving holes for receiving eggs at intervals along its circumferential direction; the stopper is provided to cover an opening of the recess; a plurality of protrusions are provided at intervals towards an edge of the stopper facing the turntable; a plurality of grooves are provided at intervals towards the edge of the turntable facing the stopper; the plurality of protrusions are provided in one-to-one correspondence with the plurality of grooves; and the protrusions are clamped within the recess.

Optionally, the egg incubator base further includes: a protective cylinder; the protective cylinder is provided on the second diaphragm; the driving mechanism is a motor; the body of the motor is provided in the second sub-cavity; an output shaft of the motor extends through the protective cylinder and is connected to the stopper.

Optionally, a plurality of holes are provided on the stopper.

Optionally, the height of the second cavity in the first direction is H cm; the height of the first sub-cavity in the first direction is D cm; wherein: H>D.

Optionally, the water supply device includes: a mounting seat, a water supply valve and a water supply bottle; the mounting seat is provided on the base; the base has a slot communicating with the first passage; the water supply valve is inserted in the slot; the water supply valve has a second passage and a vent communicating with the second passage having one end communicated with the water supply bottle and the other end communicated with the slot; in the first direction, the horizontal position of the vent is lower than the horizontal position of a side of the first diaphragm facing away from the base.

Optionally, the egg incubator base further includes: a plug; a drainage hole is provided on the mounting seat; and the plug is detachably provided at the drainage hole.

An egg incubator including: a heat source, a fan, a cover, and the egg incubator base according to any one of the above; the cover is provided to cover the base; the heat source and the fan are both provided on the cover; and the fan is provided opposite the recess.

Compared with the prior art, the beneficial effects of the egg incubator base and the egg incubator of the embodiments of the present application are:

in an embodiment of the present application, during the incubation of the first 18 days, in the present application, eggs are placed on a base and then drives a rotary seat to rotate in an accommodating space via a driving mechanism to drive the eggs to rotate on the base, at this moment, the water supply device only injects water into the second cavity via the first passage, and when the water is about to overflow the first diaphragm, the water supply device stops water supply, and at this moment, only the water in the second cavity volatilizes under the action of the heat source, the area of water evaporation is small, and only the requirement of 50% air humidity is met; and during the incubation of the next 3 days, the water supply device provides water which can overflow the first diaphragm, so that the second cavity and the first sub-cavity are both filled with water, and at this time, the water in the second cavity and the first sub-cavity is volatilized under the action of the heat source, and the area for volatilization of the water is large, which can meet the air humidity requirement of 60%. Based on this, in the present application, cooperation between a first sub-cavity, a second cavity and the water supply device in an embodiment of the present application can provide the egg incubator with two different humidity environments to operate without opening the egg incubator to achieve the requirements of different environmental humidity for different time periods of the egg incubator. Secondly, the present application also provides a driving mechanism in the second sub-cavity, so that the installation space in an accommodating cavity can be further optimized.

Figure 1:
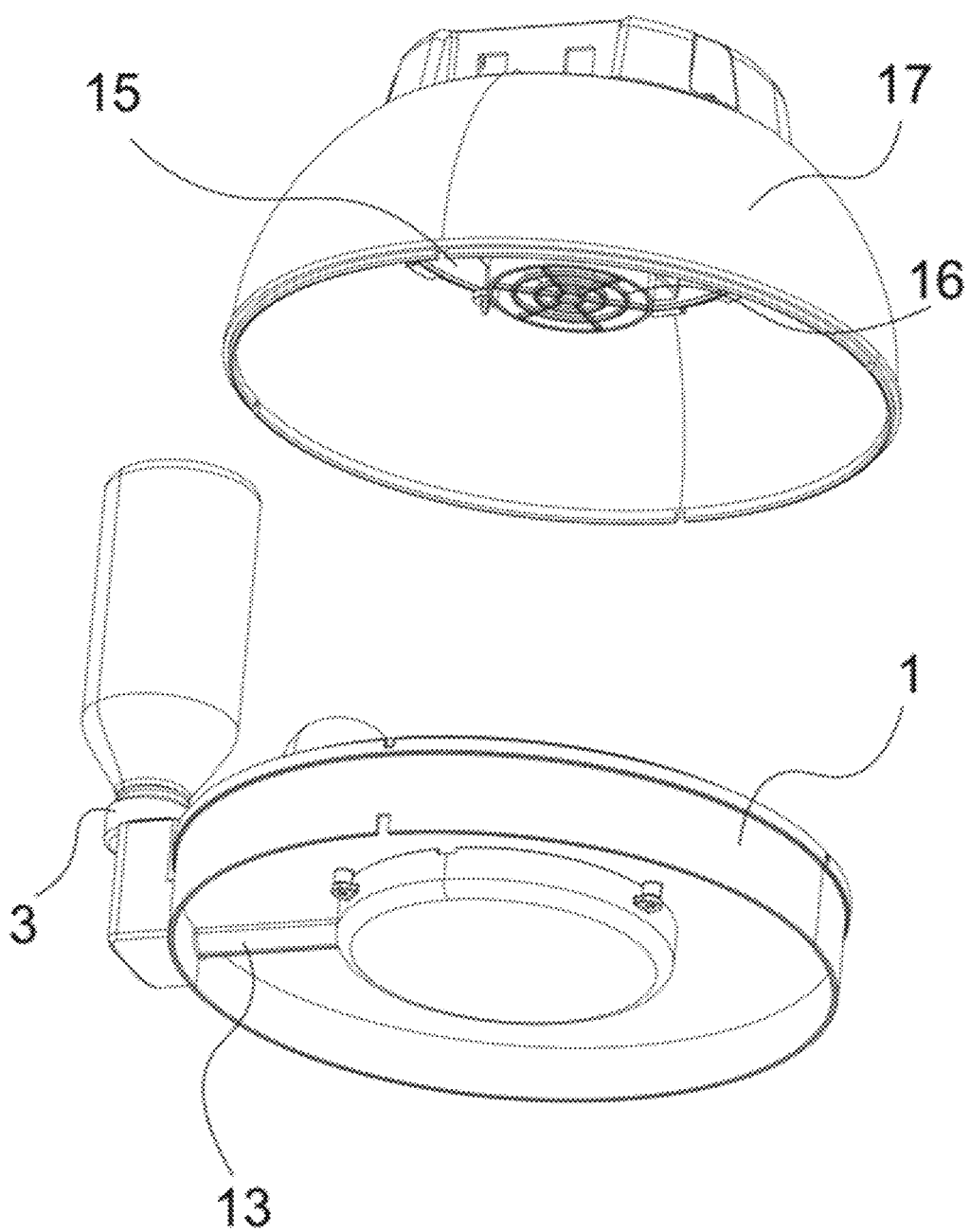
FIG. 1 is a schematic structural diagram showing an egg incubator according to an embodiment of the present application.

In the drawings. 1. base; 11. accommodating space; 12. recess; 121. first cavity; 1211. first sub-cavity; 1212. second sub-cavity; 122. second cavity; 13. first passage; 14. slot; 2. driving mechanism; 21. body; 22. output shaft; 3. water supply device; 31. mounting seat; 32. water supply valve; 321. vent; 322. second passage; 33. water supply bottle; 4. rotary seat; 41. stopper; 411. hole; 42. turntable; 421. receiving hole; 422. groove; 5. first diaphragm; 6. sleeve; 7. protrusion; 8. protective cylinder; 9. plug; 15. heat source; 16. fan; 17. cover; 18. second diaphragm; X. first direction.

DETAILED DESCRIPTION OF THE EMBODIMENTS

The specific embodiments of the present application are described in further detail below with reference to the accompanying drawings and examples. The following examples are illustrative of the present application, but are not intended to limit the scope thereof.

First, it should be noted that the top, bottom, upward, downward, etc. orientations referred to herein are defined with respect to the directions in the various figures, are relative concepts, and thus can vary depending on the different positions in which they are located and different practical situations. Therefore, these or other orientations should not be construed as limiting terms.

It should be noted that the term "including" does not exclude other elements or steps and the "a" or "an" does not exclude a plural.

Furthermore, it should be pointed out that with respect to any single feature described or implied in an embodiment herein, or shown or implied in a drawing, it is nevertheless possible to continue to combine such features (or their equivalents) to obtain further embodiments of the present application that are not directly mentioned herein.

It should be further understood that the terms "first", "second", and the like are used herein to describe various types of information, but that such information should not be limited to such terms, which are merely used to distinguish one type of information from another. For example, "first" information may also be referred to as "second" information, and similarly, "second" information may also be referred to as "first" information, without departing from the scope of the present application.

It should be noted that the same reference numbers in different drawings indicate the same or substantially the same components.

As shown in FIGS. 1 to 6, an egg incubator base according to a preferred embodiment of the present application includes: a driving mechanism 2, a water supply device 3, a base 1 for holding eggs, and a rotary seat 4 for driving the eggs to rotate. The base 1 has an accommodating space 11. A central position of the base 1 is recessed in the first direction X to form a recess 12. A first diaphragm 5 is provided in the recess 12, and the first diaphragm 5 divides the recess 12 to form a first cavity 121 and a second cavity 122. A second diaphragm 18 is provided in the first cavity 121 to divide the first cavity 121 to form a first sub-cavity 1211 and a second sub-cavity 1212 which are provided at intervals along the first direction X, and the first sub-cavity 1211 and the second cavity 122 communicate with the accommodating space 11. The base 1 has a first passage 13 having one end communicated with the second cavity 122 and the other end communicated with the water supply device 3. The driving mechanism 2 is provided in the second sub-cavity 1212, the driving mechanism 2 is used for driving the rotary seat 4 to rotate in the accommodating space 11, and eggs are placed on the base 1 and rotated thereon by the rotary seat 4 driven by the driving mechanism 2. The water supply device 3 is configured to be able to supply water to the second cavity 122 through the first passage 13 to enable the water to enter the first sub-cavity 1211 beyond the first diaphragm 5, that is to say, the water supply device 3 has two water supply modes, the first mode is to supply water to the second cavity 122 only through the first passage 13, and when the water is about to overflow the first diaphragm 5, the water supply is stopped, and at this time, only the water in the second cavity 122 volatilizes under the action of the heat source 15, and the area where the water volatilizes is smaller, and the second mode is to supply water which can overflow the first diaphragm 5, so that the second cavity 122 and the first sub-cavity 1211 are both filled with water, and at this time, the water in the second cavity 122 and the first sub-cavity 1211 is volatilized under the action of the heat source 15, and the area of volatilization of the water is relatively large, wherein since the humidity in the egg incubator is related to the area of volatilization of the water in the second cavity 122 and the first sub-cavity 1211, the present application provides different humidity environments through different water supply modes of the water supply device 3.

Based on the above-mentioned structure, the eggs in the egg incubator of the present application need to provide about 65% air humidity for incubation for about 3 days after incubation with about 50% air humidity for about 18 days during incubation. Therefore, during the incubation of the first 18 days, in the present application, eggs are placed on a base 1 and then drives a rotary seat 4 to rotate in an accommodating space 11 via a driving mechanism 2 to drive the eggs to rotate on the base 1, at this moment, the water supply device 3 only injects water into the second cavity 122 via the first passage 13, and when the water is about to overflow the first diaphragm 5, the water supply device 3 stops water supply, and at this moment, only the water in the second cavity 122 volatilizes under the action of the heat source 15, the area of water evaporation is small, and only the requirement of 50% air humidity is met; and during the incubation of the next 3 days, the water supply device 3 provides water which can overflow the first diaphragm 5, so that the second cavity 122 and the first sub-cavity 122 are both filled with water, and at this time, the water in the second cavity 122 and the first sub-cavity 1211 is volatilized under the action of the heat source 15, and the area for volatilization of the water is large, which can meet the air humidity requirement of 60%. Based on this, in the present application, cooperation between a first sub-cavity 1211, a second cavity 122 and the water supply device 3 in an embodiment of the present application can provide the egg incubator with two different humidity environments to operate without opening the egg incubator to achieve the requirements of different environmental humidity for different time periods of the egg incubator. Secondly, the present application also provides a driving mechanism 2 in the second sub-cavity 1212, so that the installation space in an accommodating cavity can be further optimized.

Figure 4:
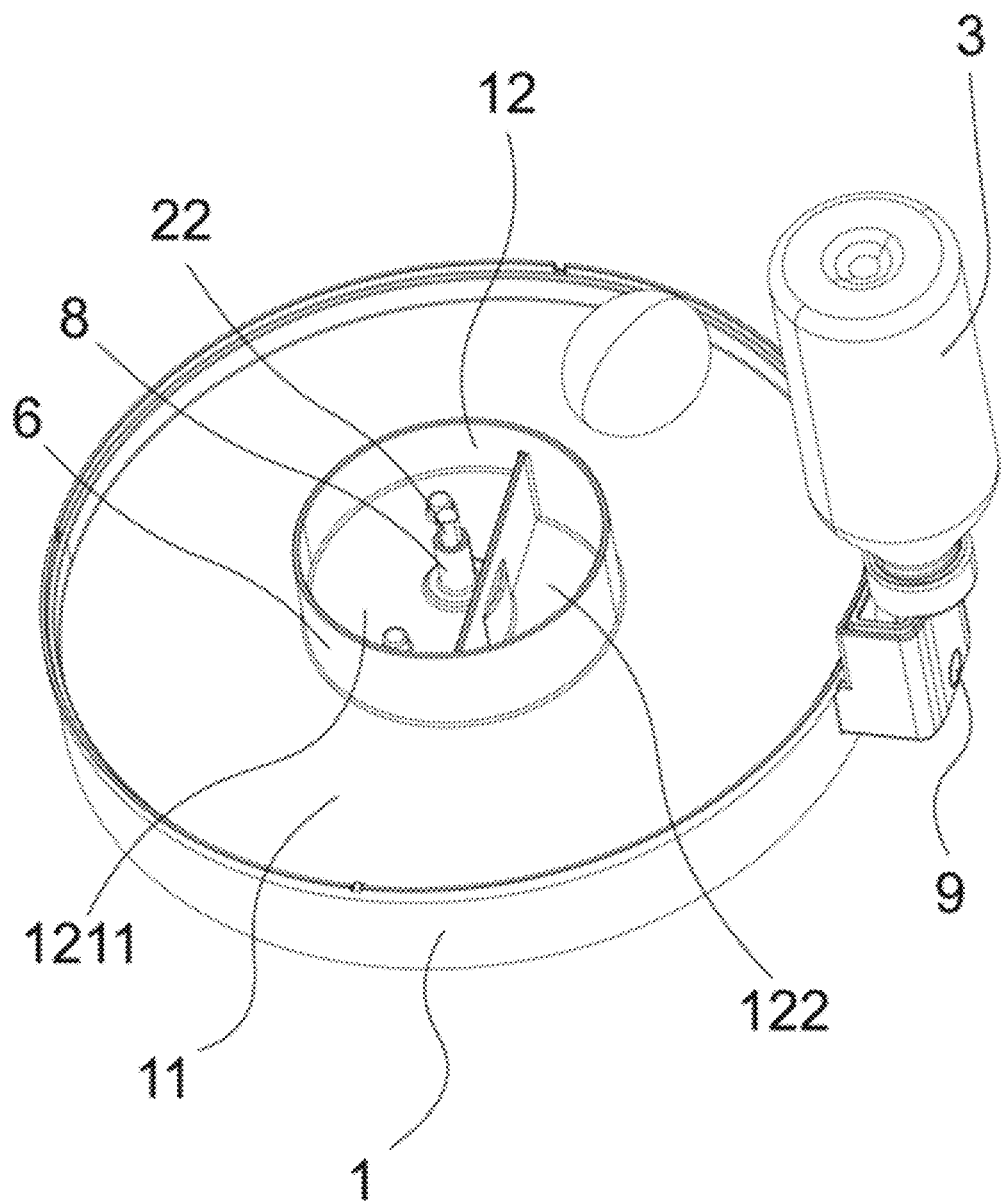
FIG. 4 is a schematic structural diagram showing a base according to an embodiment of the present application.
Figure 5:
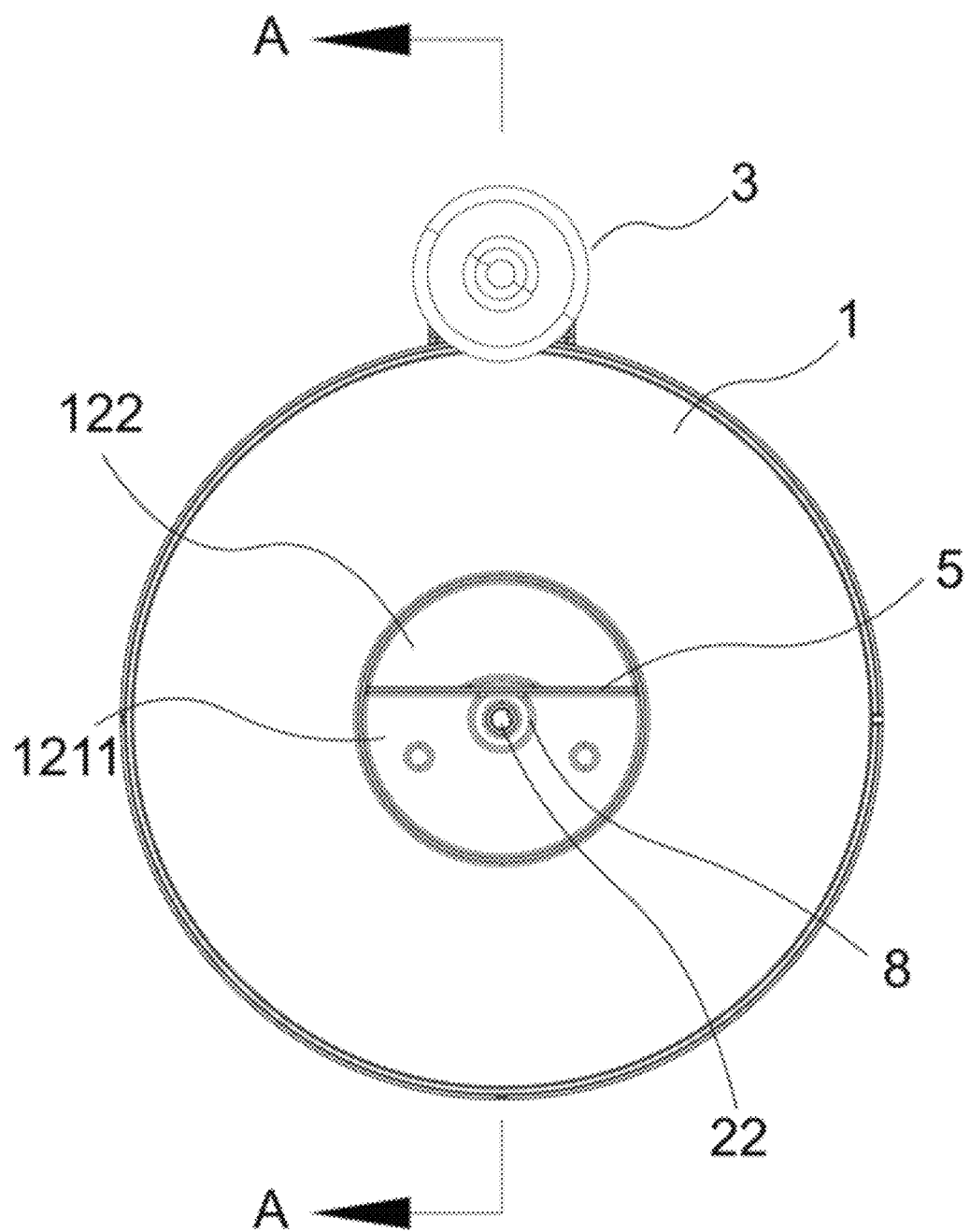
FIG. 5 is a top view of a base according to an embodiment of the present application.
Figure 6:
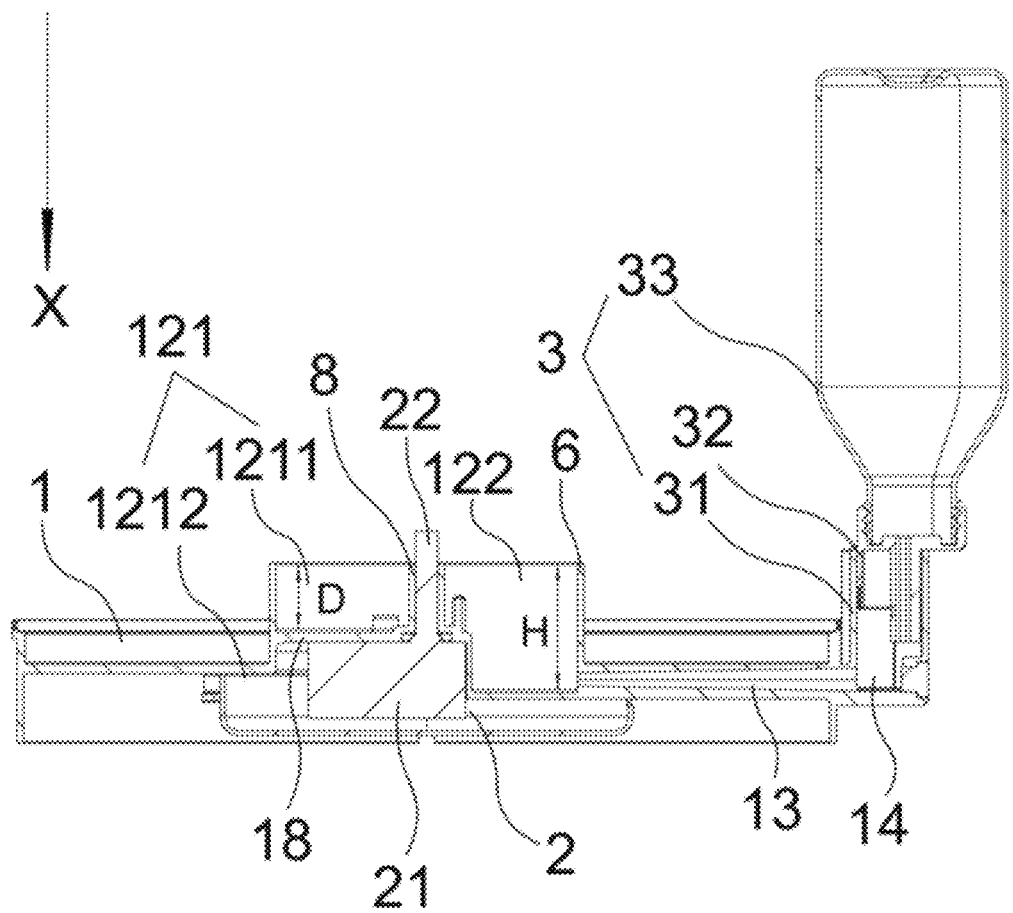
FIG. 6 is a cross-sectional view A-A in FIG. 5.

Further, referring to FIGS. 4 and 6, the present application also includes: a sleeve 6. The sleeve 6 is provided on the base 1 and encloses with the base 1 to form the recess 12, and the first direction X is an axis of the sleeve 6, so that the first sub-cavity 1211 is located above the second sub-cavity 1212, and the second cavity 122 is located at one side of the first sub-cavity 1211 and the second sub-cavity 1212 in the horizontal direction.

Specifically, the sleeve 6 is provided at a central position of the base 1 and is higher than an end face of the base 1 for holding eggs, and since the heat source 15 and the fan 16 of the egg incubator are provided at the central position of the cover 17, the sleeve 6 is provided at the central position in the present application, on the one hand, the rotation center can be provided for the rotation of the turntable 42, and on the other hand, the water can be made closer to the fan 16 and the heat source 15, so that the heat dissipation effect of the egg incubator base in the present application is better and the evaporation of the water is more advantageous. At the same time, positioning the sleeve 6 in a central position enables the water body volatilized from the inside of the sleeve 6 to spread evenly around, so that the heating in the accommodating space 11 is more even. Secondly, since the first sub-cavity 1211 and the second cavity 122 of the present application are closer to the heat source 15 and the fan 16, the present application has a higher heat dissipation efficiency, enabling the present application to design a smaller volume of the first sub-cavity 1211 and the second cavity 122, and making the structure of the egg incubator base of the present application more compact.

It will be appreciated that, with reference to FIG. 6, the first diaphragm 5 of the present application is provided within the recess 12 in a first direction X to divide the recess 12 into a first cavity 121 and a second cavity 122 spaced in a horizontal direction. Secondly, in order to avoid excessive water flow out of the sleeve 6, the upper edge of the first diaphragm 5 is lower than the upper edge of the sleeve 6, so that water does not overflow the upper edge of the sleeve 6 when water overflows the first diaphragm 5 from the second cavity 122 into the first sub-cavity 1211.

In a possible embodiment, the rotary seat 4 includes: a stopper 41 and a turntable 42. The turntable 42 is sleeved on the sleeve 6, the stopper 41 is connected to the driving mechanism 2, and the stopper 41 is connected to the turntable 42. The present application can drive the rotation of the stopper 41 via the driving mechanism 2, and then drive the rotation of the turntable 42, thereby driving the eggs to rotate on the base 1.

Figure 2:
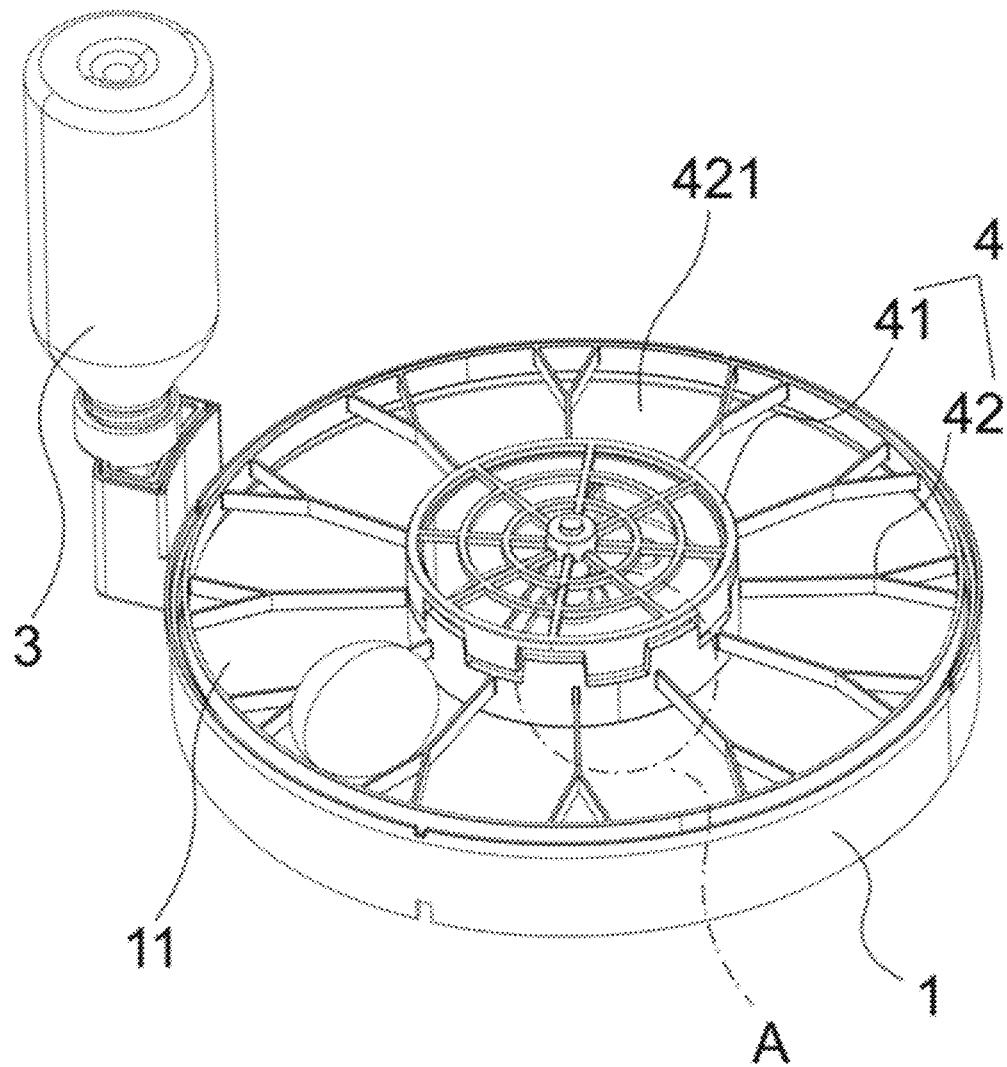
FIG. 2 is a schematic structural diagram showing an egg incubator base according to an embodiment of the present application.
Figure 3:
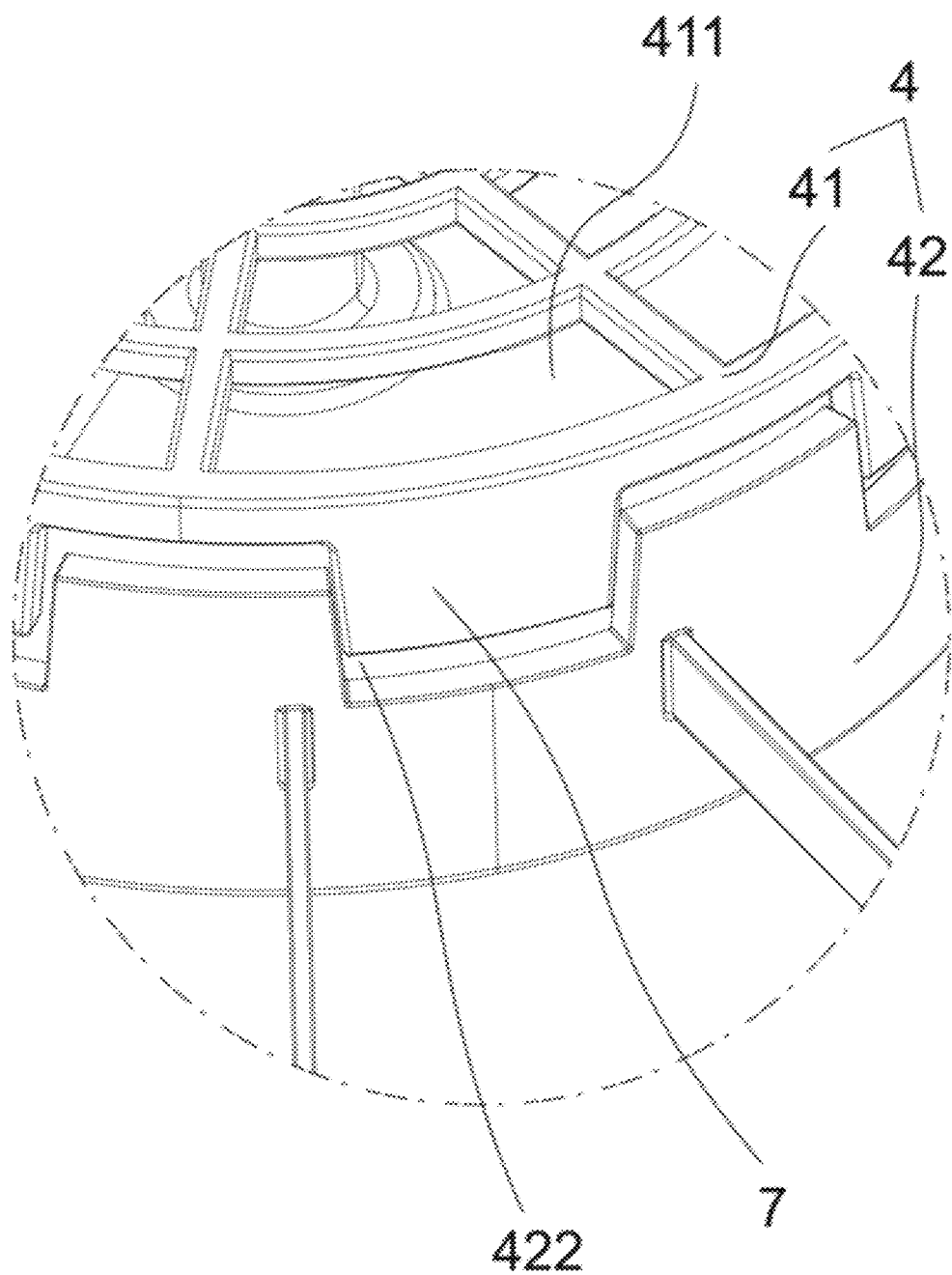
FIG. 3 is an enlarged schematic diagram of A in FIG. 2.

Further, referring to FIGS. 2 and 3, the stopper 41 is provided with holes 411.

In one possible embodiment, referring to FIGS. 2 and 3, the turntable 42 is provided with a plurality of receiving holes 421 for receiving eggs at intervals along its circumferential direction, so that the turntable 42 of the present application can receive a plurality of eggs at the same time, the size of the receiving holes 421 being adapted to the size of the eggs, so that no severe shaking occurs during the rotation of the turntable 42 after the eggs are placed in the receiving holes 421. The stopper 41 is provided to cover the opening of the recess 12 to prevent a young poul from falling into the second cavity 122 or the first sub-cavity 1211 from the upper end opening of the recess 12 after successful incubation from a shell. A plurality of stoppers 41 is provided with a plurality of protrusions 7 at intervals toward an edge of the turntable 42. A plurality of grooves 422 are spaced toward the edge of the turntable 42 facing the stopper 41. The plurality of protrusions 7 are provided in one-to-one correspondence with the plurality of grooves 422; the protrusions 7 are clamped in the groove 422, and the cooperation between the turntable 42 and the stopper 41 is achieved by the cooperation between the protrusion 7 and the groove 422.

It will be appreciated that the sleeve 6 of the present application is cylindrical and that the turntable 42 has a circular aperture through which the sleeve 6 passes to effect rotation of the turntable 42 relative to the sleeve 6.

In one possible embodiment, referring to FIGS. 4 and 6, the present application further includes: the protective cylinder 8 is protected. The protective cylinder 8 is provided on the second diaphragm 18, the driving mechanism 2 is a motor, a body 21 of the motor is provided in the second sub-cavity 1212, an output shaft 22 of the motor penetrates the protective cylinder 8 and is connected to the stopper 41, and the arrangement of the protective cylinder 8 can prevent water in the first sub-cavity 1211 and the second cavity 122 from entering the second sub-cavity 1212 to cause damage to the motor.

Further preferably, a detachable connection is provided between the output shaft 22 of the motor and the stopper 41.

Specifically, referring to FIG. 6, the protective cylinder 8 extends in a first direction X, and the output shaft 22 of the motor extends in the first direction X, so that the turntable 42 can be driven to rotate about and about the axis of the sleeve 6.

Further, referring to FIG. 6, the height of the second cavity 122 in the first direction X is H cm. The height of the first sub-cavity 1211 in the first direction X is D cm, wherein: H>D. That is, the height of the second cavity 122 in the first direction X is greater than the height of the first sub-cavity 1211 in the first direction X, so that a certain space is reserved for the second sub-cavity 1212 in the first direction X, and the second sub-cavity 1212 is used for mounting the motor, so that the mounting space in the accommodating cavity can be further optimized.

Figure 7:
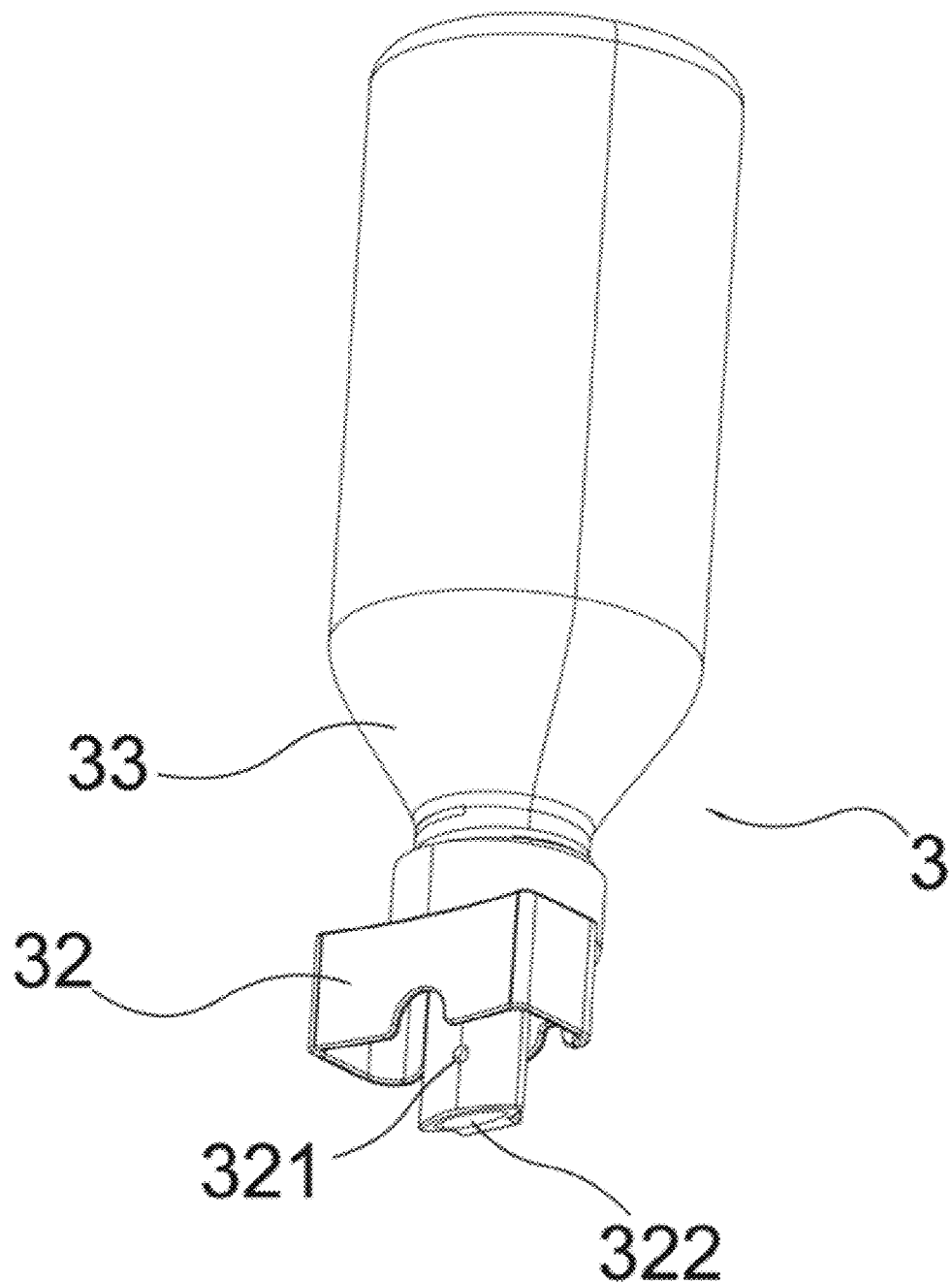
FIG. 7 is a schematic structural diagram of a water supply device according to an embodiment of the present application.

In a possible embodiment, with reference to FIGS. 6 and 7, the water supply device 3 includes: a mounting seat 31, a water supply valve 32 and a water supply bottle 33. The mounting seat 31 is provided on the base 1, the base 1 has a slot 14 communicated with the first passage 13, the water supply valve 32 is inserted in the slot 14, the water supply valve 32 has a second passage 322 and a vent 321 communicated with the second passage 322 having one end communicated with the water supply bottle 33 and the other end communicated with the slot 14, and in the first direction X, the horizontal position of the vent 321 is lower than the horizontal position of the side of the first diaphragm 5 facing away from the base 1. In a specific implementation process, during the incubation of the first 18 days, the water supply valve 32 is inserted into the slot 14, so that in the present application, with the water supply valve 32 mounted, water flows from the water supply bottle 33 into the slot 14 via the second passage 322 and flows into the second cavity 122 via the first passage 13; since the slot 14 is communicated with the second cavity 122, the water levels in the slot 14 and the second cavity 122 can keep level with each other; since the horizontal position of the vent 321 is lower than the horizontal position of the side of the first diaphragm 5 facing away from the base 1, when the water in the second cavity 122 is about to overflow the first diaphragm 5, the water in the slot 14 blocks the drainage hole on the water supply valve 32, so that the water supply bottle 33 cannot continue to supply water, so that the water cannot overflow the first diaphragm 5 from the second cavity 122 into the first sub-cavity 1211 when the water supply valve 32 is mounted, thereby enabling only the water in the second cavity 122 to be volatilized. During the incubation of the next 3 days, it is only necessary to pull the water supply valve 32 out of the slot 14 and then add water to the slot 14 from the outside until the water in the second cavity 122 overflows the first diaphragm 5 into the first sub-cavity 1211.

Further, the present application also includes: a plug 9. A drainage hole is provided on the mounting seat 31; the plug 9 is detachably provided at the vent, and the water in the second cavity 122 can be discharged by detaching the plug 9 from the vent.

The present application also provides an egg incubator including: a heat source 15, a fan 16, a cover 17, and an egg incubator base as described in any of the above. The cover 17 is provided to cover the base 1, the heat source 15 and the fan 16 are both provided on the cover 17, and the fan 16 is provided opposite to the recess 12, so that the fan 16 can volatilize water inside the recess 12.

Therefore, the present application provides an egg incubator base and an egg incubator, during the incubation of the first 18 days, in the present application, during the incubation of the first 18 days, in the present application, eggs are placed on a base 1 and then drives a rotary seat 4 to rotate in an accommodating space 11 via a driving mechanism 2 to drive the eggs to rotate on the base 1, at this moment, the water supply device 3 only injects water into the second cavity 122 via the first passage 13, and when the water is about to overflow the first diaphragm 5, the water supply device 3 stops water supply, and at this moment, only the water in the second cavity 122 volatilizes under the action of the heat source 15, the area of water evaporation is small, and only the requirement of 50% air humidity is met; and during the incubation of the next 3 days, the water supply device 3 provides water which can overflow the first diaphragm 5, so that the second cavity 122 and the first sub-cavity 122 are both filled with water, and at this time, the water in the second cavity 122 and the first sub-cavity 1211 is volatilized under the action of the heat source 15, and the area for volatilization of the water is large, which can meet the air humidity requirement of 60%. Based on this, in the present application, cooperation between a first sub-cavity 1211, a second cavity 122 and the water supply device 3 in an embodiment of the present application can provide the egg incubator with two different humidity environments to operate without opening the egg incubator to achieve the requirements of different environmental humidity for different time periods of the egg incubator. Secondly, the present application also provides a driving mechanism 2 in the second sub-cavity 1212, so that the installation space in an accommodating cavity can be further optimized.

While the foregoing is directed to the preferred embodiments of the present invention, it will be understood by a person skilled in the art that various changes may be made therein without departing from the spirit and scope of the present invention.

What is claimed is:

1. An egg incubator base, comprising: a driving mechanism (2), a water supply device (3), a base (1) for holding eggs, and a rotary seat (4) for driving the eggs to rotate; wherein the base (1) has an accommodating space (11); a central position of the base (1) is recessed in a first direction (X) to form a recess (12); a first diaphragm (5) is provided in the recess (12); the first diaphragm (5) separates the recess (12) to form a first cavity (121) and a second cavity (122); a second diaphragm (18) is provided in the first cavity (121) to divide the first cavity (121) into a first sub-cavity (1211) and a second sub-cavity (1212) provided at intervals along the first direction (X); the first sub-cavity (1211) and the second cavity (122) are communicated with the accommodating space (11); the base (1) has a first passage (13) having one end communicated with the second cavity (122) and the other end communicated with the water supply device (3); the driving mechanism (2) is provided in the second sub-cavity (1212) and is used for driving the rotary seat (4) to rotate in the accommodating space (11); and the water supply device (3) is configured to be able to fill the second cavity (122) with water through the first passage (13) such that water passes over the first diaphragm (5) into the first sub-cavity (1211).

2. The egg incubator base according to claim 1, further comprising: a sleeve (6); wherein the sleeve (6) is provided on the base (1) and encloses with the base (1) to form the recess (12); the first direction (X) is an axis of the sleeve (6).

3. The egg incubator base according to claim 2, wherein the rotary seat (4) comprises: a stopper (41) and a turntable (42); the turntable (42) is sleeved on the sleeve (6); the stopper (41) is connected to the driving mechanism (2); and the stopper (41) is connected to the turntable (42).

4. The egg incubator base according to claim 3, wherein the turntable (42) is provided with a plurality of receiving holes (421) for receiving eggs at intervals along its circumferential direction; the stopper (41) is provided to cover an opening of the recess (12); a plurality of protrusions (7) are provided at intervals towards an edge of the stopper (41) facing the turntable (42); a plurality of grooves (422) are provided at intervals towards the edge of the turntable (42) facing the stopper (41); the plurality of protrusions (7) are provided in one-to-one correspondence with the plurality of grooves (422); and the protrusions (7) are clamped within the recess (422).

5. The egg incubator base according to claim 4, further comprising: a protective cylinder (8); the protective cylinder (8) is provided on the second diaphragm (18); the driving mechanism (2) is a motor; a body (21) of the motor is provided in the second sub-cavity (1212); an output shaft (22) of the motor penetrates the protective cylinder (8) and is connected to the stopper (41).

6. The egg incubator base according to claim 3, wherein a plurality of holes (411) are formed in the stopper (41).

7. The egg incubator base according to claim 1, wherein a height of the second cavity (122) in the first direction (X) is H cm; a height of the first sub-cavity (1211) in the first direction (X) is D cm; wherein: H>D.

8. The egg incubator base according to claim 1, wherein the water supply device (3) comprises: a mounting seat (31), a water supply valve (32) and a water supply bottle (33); the mounting seat (31) is provided on the base (1); the base (1) has a slot (14) communicating with the first passage (13); the water supply valve (32) is inserted in the slot (14); the water supply valve (32) has a second passage (322) and a vent (321) communicating with the second passage (322) having one end communicated with the water supply bottle (33) and the other end communicated with the slot (14); in the first direction (X), the horizontal position of the vent (321) is lower than the horizontal position of a side of the first diaphragm (5) facing away from the base (1).

9. The egg incubator base according to claim 8, further comprising: a plug (9); a drainage hole is provided on the mounting seat (31); and the plug (9) is detachably provided at the drainage hole.

10. An egg incubator, comprising: a heat source (15), a fan (16), a cover (17), and the egg incubator base according to claim 1; the cover (17) is provided to cover the base (1); the heat source (15) and the fan (16) are both provided on the cover (17); and the fan (16) is provided opposite the recess (12).

\* \* \* \* \*